United States Patent
An et al.

(10) Patent No.: US 11,986,950 B2
(45) Date of Patent: May 21, 2024

(54) GRIPPER AND ROBOTIC ARM

(71) Applicants: SHANGHAI FLEXIV ROBOTICS TECHNOLOGY CO., LTD., Shanghai (CN); FLEXIV LTD., Grand Cayman (GB)

(72) Inventors: Ran An, Santa Clara, CA (US); Tingke Song, Shanghai (CN); Juncai Peng, Shanghai (CN)

(73) Assignees: SHANGHAI FLEXIV ROBOTICS TECHNOLOGY CO., LTD., Shanghai (CN); FLEXIV LTD., Grand Cayman (GB)

( * ) Notice: Subject to any disclaimer, the term of this patent is extended or adjusted under 35 U.S.C. 154(b) by 205 days.

(21) Appl. No.: 17/609,901

(22) PCT Filed: Oct. 13, 2020

(86) PCT No.: PCT/CN2020/120561
§ 371 (c)(1),
(2) Date: Nov. 9, 2021

(87) PCT Pub. No.: WO2022/077203
PCT Pub. Date: Apr. 21, 2022

(65) Prior Publication Data
US 2022/0305670 A1    Sep. 29, 2022

(51) Int. Cl.
*B25J 15/02*    (2006.01)
(52) U.S. Cl.
CPC .................. *B25J 15/026* (2013.01)
(58) Field of Classification Search
CPC ....... B25J 15/026; B25J 15/028; B25B 5/102; B25B 5/166

(Continued)

(56) References Cited

U.S. PATENT DOCUMENTS 3,261,479 A * 7/1966 Baker ................ B25J 15/026
901/38
4,765,668 A * 8/1988 Slocum .............. B25J 15/026
901/37

(Continued)

FOREIGN PATENT DOCUMENTS

CN        1098483 A        2/1995
CN     201193689 Y        2/2009

(Continued)

OTHER PUBLICATIONS

Office Action issued in Chinese Patent Application No. 202011088771.2, dated Dec. 2, 2021, 7 pages.

(Continued)

*Primary Examiner* — Dean J Kramer
(74) *Attorney, Agent, or Firm* — Dorsey & Whitney LLP (57) ABSTRACT

A gripper includes a lead screw, a first gripping jaw and a second gripping jaw. The lead screw includes a spiral portion having at least one first spiral track and at least one second spiral track with opposite helical directions. A portion of a coverage of the first spiral track overlaps a portion of a coverage of the second spiral track along a length of the spiral portion. The first gripping jaw has a first pin extending into the first spiral track, and the second gripping jaw has a second pin extending into the second spiral track. When the spiral portion rotates, the first spiral track drives the first pin to allow a first linear movement of the first gripping jaw, and the second spiral track drives the second pin to allow a second linear movement of the second gripping jaw opposite to the first linear movement.

16 Claims, 4 Drawing Sheets

(58) Field of Classification Search
USPC ..... 294/119.1, 207; 269/189, 226, 233, 241, 269/242
See application file for complete search history.

(56) References Cited

U.S. PATENT DOCUMENTS

| | | | |
|---|---|---|---|
| 4,955,653 A | * | 9/1990 | Beals .................. B25J 15/0273 901/38 |
| 5,751,083 A | | 5/1998 | Tamura et al. |
| 5,755,475 A | * | 5/1998 | Zajac, Jr. ............. B25J 15/0253 294/86.4 |
| 5,947,539 A | * | 9/1999 | Long ..................... B25J 15/026 294/902 |
| 6,505,871 B2 | * | 1/2003 | McCormick .......... B25J 15/028 294/907 |

FOREIGN PATENT DOCUMENTS

| | | | |
|---|---|---|---|
| CN | 204267630 U | | 4/2015 |
| CN | 204280889 U | | 4/2015 |
| CN | 204382288 U | * | 6/2015 |
| CN | 204382288 U | | 6/2015 |
| CN | 205600356 U | | 9/2016 |
| CN | 106641147 A | | 5/2017 |
| CN | 209831685 U | | 12/2019 |
| CN | 110883786 A | | 3/2020 |
| CN | 111230908 A | | 6/2020 |
| CN | 111566314 A | | 8/2020 |
| EP | 3567280 A1 | | 11/2019 |
| JP | H10142520 A | | 5/1998 |
| JP | 2020037468 A | | 3/2020 |
| SU | 1329960 A1 | | 8/1987 |
| TW | I692388 B | | 5/2020 |

OTHER PUBLICATIONS

Office Action issued in Chinese Patent Application No. 202011088771.2, dated Jun. 28, 2021, 8 pages.
Jiang, et al., "Printing and Dyeing Machinery", Claim 1, Feb. 1985, 4 pages.
Extended European Search Report for European Application No. 20956985.4 dated Sep. 29, 2023.
International Search Report from International Application No. PCT/CN2020/120561 dated Jul. 9, 2021.
Office Action for Japanese Application No. 2023-520498 mailed Feb. 26, 2024.

* cited by examiner

GRIPPER AND ROBOTIC ARM

CROSS REFERENCE TO RELATED APPLICATIONS

The application is a U.S. National Stage of International Application No. PCT/CN2020/120561, filed Oct. 13, 2020, the content of which is incorporated herein by reference in its entirety.

TECHNICAL FIELD

The present disclosure relates to a gripper and a robotic arm.

BACKGROUND

In the field of mechanical machining, the positioning and position adjustment of a workpiece being processed are usually carried out by means of a robotic arm equipped with a gripper. Traditionally, telescopic cylinder-driven grippers and lead screw-driven grippers are used.

The telescopic cylinder-driven gripper includes two clamps and two telescopic cylinders that drive the two clamps to rotate respectively. The telescopic movement of each telescopic cylinder can control the movement of each clamp, so that the two clamps can be closed or opened. Due to the poor synchronization of the two telescopic cylinders, it is easy to cause the asynchronous movement of the two clamps, which will lead to poor gripping accuracy.

The lead screw-driven grippers can overcome the aforementioned problems of the telescopic cylinder-driven grippers. For example, in the grippers disclosed in Chinese patent CN205600356U, two ends of the threaded portion of the lead screw are respectively provided with left-handed thread and right-handed thread, and a spacer is provided between the left-handed thread and the right-handed thread. A left gripping jaw is connected to the left-handed thread through a left-handed nut, and a right gripping jaw is connected to the right-handed thread through a right-handed nut. When such grippers grab objects, a motor drives the lead screw to move, and then the lead screw drives the left and right gripping jaws to move close to or move away from each other. Although such grippers have better synchronization between the left and right gripping jaws, the axial space occupied by the lead screw is too large, and the structures of the grippers and the gripper jaws thereof are not compact, causing the grippers to be too large and heavy. When large-size objects need to be grabbed, the use of such grippers not only causes a large load burden on the robotic arm, but also makes it difficult for the robotic arm to get into a small space for grabbing.

SUMMARY

The present disclosure aims to provide a gripper with a compact structure. The present disclosure also provides a robotic arm.

One aspect of the present disclosure provides a gripper that includes a lead screw, a first gripping jaw and a second gripping jaw. The lead screw includes a spiral portion and a driving portion, and the spiral portion is provided with at least one first spiral track and at least one second spiral track with opposite helical directions. A first end of the first spiral track corresponds to a first end of the spiral portion, and a second end of the first spiral track extends toward a second end of the spiral portion. A second end of the second spiral track corresponds to the second end of the spiral portion, and a first end of the second spiral track extends toward the first end of the spiral portion. A portion of a coverage of the first spiral track overlaps a portion of a coverage of the second spiral track along a length of the spiral portion. The first gripping jaw has at least one first pin extending into the first spiral track, and the second gripping jaw has at least one second pin extending into the second spiral track. The first gripping jaw and the second gripping jaw are configured in such a way that when the driving portion drives the spiral portion to rotate, the first spiral track drives the first pin to allow the first gripping jaw to perform a first linear movement in a direction parallel to the lead screw, and the second spiral track drives the second pin to allow the second gripping jaw to perform a second linear movement opposite to the first linear movement of the first gripping jaw.

Another aspect of the present disclosure provides a robotic arm including the above-mentioned gripper.

DETAILED DESCRIPTION

FIGS. 1-6 show the structure of a gripper according to some embodiments of the present disclosure. As shown in FIGS. 1-4, the gripper includes a lead screw 2, a first gripping jaw 31, a second gripping jaw 32, a first guiding mechanism 1a, and a second guiding mechanism 1b.

Figure 2:
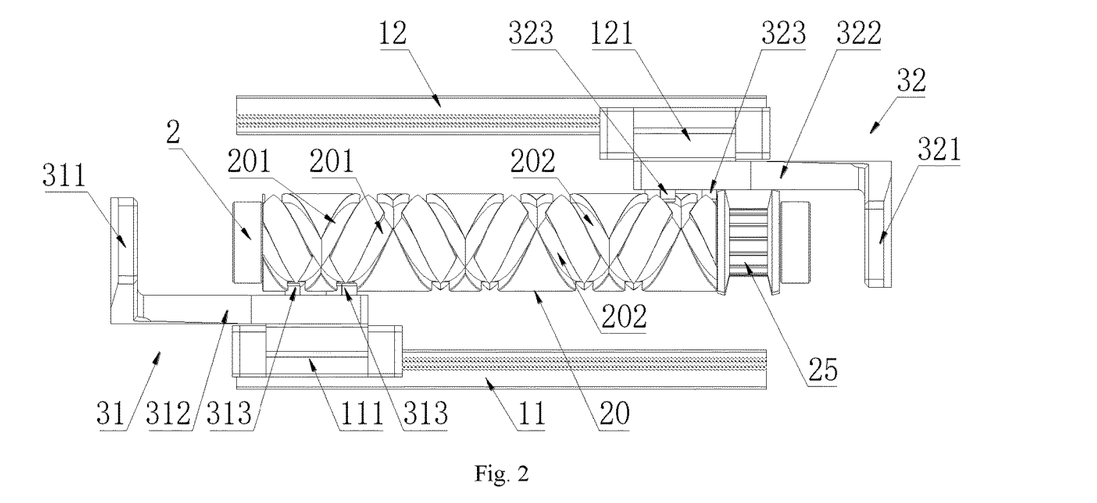
FIG. 2 is a top view of the gripper shown in FIG. 1.

The lead screw 2 includes a spiral portion 20 and a driving portion 25. The driving portion 25 can be located at either end or both ends of the spiral portion 20. The spiral portion 20 is provided with two first spiral tracks 201 and two second spiral tracks 202, and the first spiral tracks 201 and the second spiral tracks 202 are of opposite helical directions. Referring to FIG. 2, the two first spiral tracks 201 are extending in parallel and spaced apart from each other in an axial direction of the lead screw 2, and the two second spiral tracks 202 are extending in parallel and spaced apart from each other in the axial direction of the lead screw 2. A first end of each first spiral track 201 corresponds to a first end of the spiral portion 20, and a second end of each first spiral track 201 extends toward a second end of the spiral portion 20. A second end of each second spiral track 202 corresponds to the second end of the spiral portion 20, and a first end of each second spiral track 202 extends toward the first end of the spiral portion 20. For example, the first end of each first spiral track 201 can be at the first end of the spiral portion 20, and the second end of each second spiral track 202 is at the second end of the spiral portion 20.

In some embodiments, a portion of a coverage of the first spiral track 201 overlaps a portion of a coverage of the second spiral track 202 along a length of the spiral portion 20. The section where coverage of the first spiral track 201 and the second spiral track 202 overlap may also be referred to as spiral cross section. As can be seen from the figures, in this embodiment, the second end of each first spiral tracks 201 extends to the second end of the spiral portion 20, and the first end of each second spiral tracks 202 extends to the first end of the spiral portion 20, so an axial length of the spiral portion 20 is equal to an axial length of the spiral cross section. That is, each first spiral track 201 and each second spiral track 202 respectively extends over an entire length of the spiral portion 20. It should be understood that, in other embodiments, the second end of each first spiral track 201 may not extend to the second end of the spiral portion 20, and/or the first end of each second spiral track 202 may not extend to the first end of the spiral portion 20, so that the first spiral tracks 201 and the second spiral tracks 202 may partially overlap.

Both the first gripping jaw 31 and the second gripping jaw 32 are configured to be suitable for performing a linear movement in a direction parallel to the lead screw 2. There are many implementations for making the first gripping jaw 31 and the second gripping jaw 32 perform the linear movement parallel to the lead screw 2. In this embodiment, the first gripping jaw 31 is slidably connected to the first guiding mechanism 1a, and the first gripping jaw 31 performs a first linear movement under the guidance of the first guiding mechanism 1a. The second gripping jaw 32 is slidably connected to the second guiding mechanism 1b, and the second gripping jaw performs a second linear movement under the guidance of the second guiding mechanism 1b. The first guiding mechanism 1a and the second guiding mechanism 1b will be described in detail below.

Figure 4:
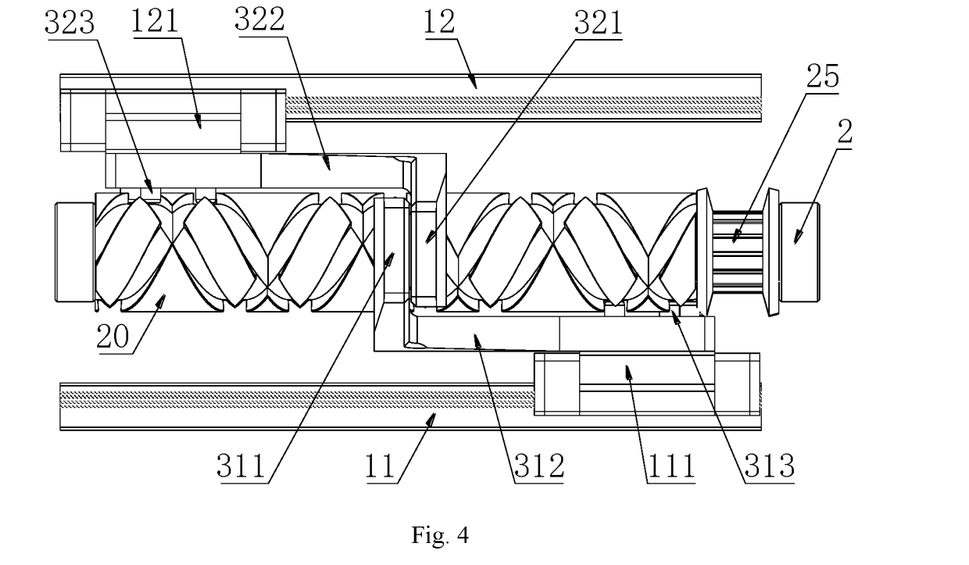
FIG. 4 is a top view of the gripper shown in FIG. 2.

In this embodiment, the first gripping jaw 31 may have several first pins 313. Some of the first pins 313 extend into the one of the first spiral tracks 201, and other first pins 313 extend into the rest of the first spiral tracks 201. Each first pin 313 is in sliding fit with the corresponding first spiral track 201. That is, any one of the first spiral tracks 201 is slidably fitted with at least one of the first pins 313. FIG. 4 shows an implementation structure of the first gripping jaw 31, and the first pins 313 can be respectively installed in several pin holes 3121 on the first gripping jaw 31. In this way, when the lead screw 2 rotates, the first spiral tracks 201 can push the first pins 313 to perform a linear movement parallel to the lead screw 2, thereby driving the first gripping jaw 31 to perform the first linear movement parallel to the lead screw 2. By providing these first pins 313, it facilitates applying even force on the first gripping jaw 31, realizing smooth movement of the first grapping jaw 31.

In this embodiment, the structure of the second gripping jaw 32 may be similar to that of the first gripping jaw 31. In the same way, the second gripping jaw 32 may have several second pins 323. A portion of the second pins 323 extend into the one second spiral tracks 202, and the other portion of the second pins 323 extend into the other second spiral tracks 202. Each second pin 323 is in a sliding fit with the corresponding second spiral track 202. That is, any one of the second spiral tracks 202 is slidably fitted with at least one of the second pins 323. In this way, when the lead screw 2 rotates, the second spiral tracks 202 can push the second pins 323 to perform a linear movement parallel to the lead screw 2, thereby driving the second gripping jaw 32 to perform the second linear movement parallel to the lead screw 2. It can be understood that the first movement direction of the first gripping jaw 31 is opposite to the second movement direction of the second gripping jaw 32. By providing these second pins 323, it facilitates applying even force applied on the second gripping jaw 32, realizing smooth movement of the second gripping jaw 31.

When the driving portion 25 of the lead screw 2 is driven to rotate, the driving portion 25 drives the spiral portion 20 to rotate together with the driving portion 25 either in a first direction or in a second direction opposite to the first direction. That is, the relative movement between the first gripping jaw 31 and the second gripping jaw 32 can be realized by the cooperation between the first pins 313, the second pins 323 and the corresponding first spiral tracks 201, the second spiral tracks 202, respectively.

Figure 1:
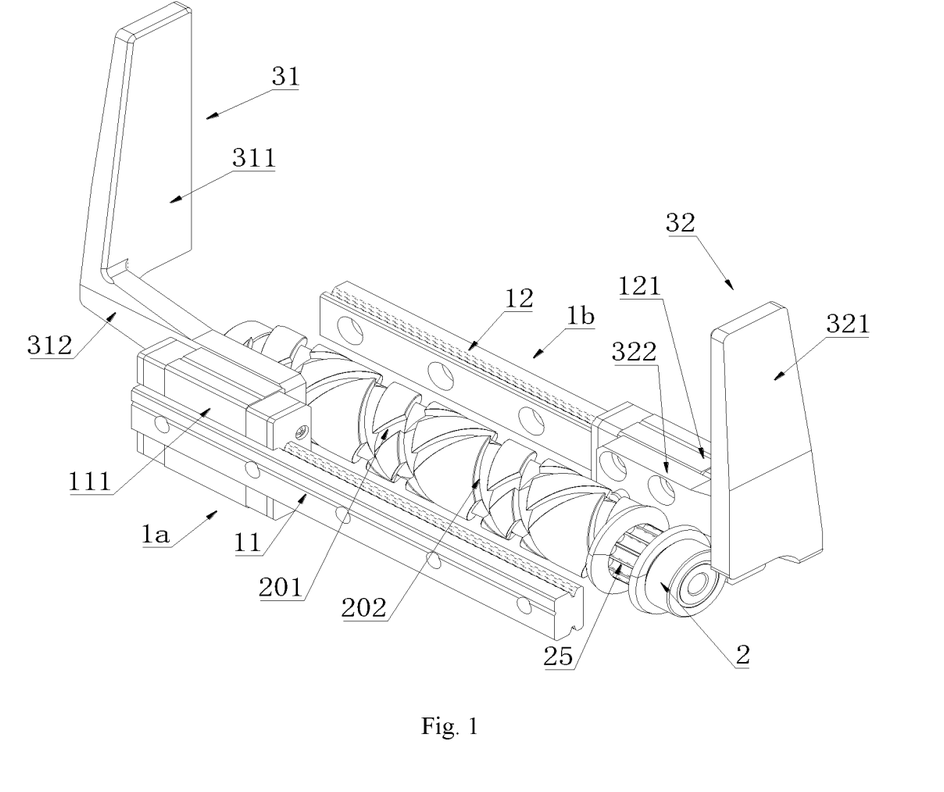
FIG. 1 is a perspective view of a gripper according to an embodiment of the present disclosure, in which a first gripping jaw and a second gripping jaw are separated and the distance between the first gripping portion and the second gripping portion is the maximum gripping distance.

In some embodiments, when at least one first pin 313 is located at the first end of the corresponding first spiral track 201 (as long as there is one first pin 313 close to the first ends of the first spiral tracks 201), and at least one second pin-323 is located at the second end of the corresponding second spiral track 202 (as long as there is one second pin 323 close to the second ends of the second spiral tracks 202), the first gripping jaw 31 and the second gripping jaw 32 are in a state of being far away from each other and the gripping distance between them is taken as the maximum gripping distance (that is, the first gripping jaw 31 and the second gripping jaw 32 are opened to the maximum extent), as shown in FIG. 1.

Figure 3:
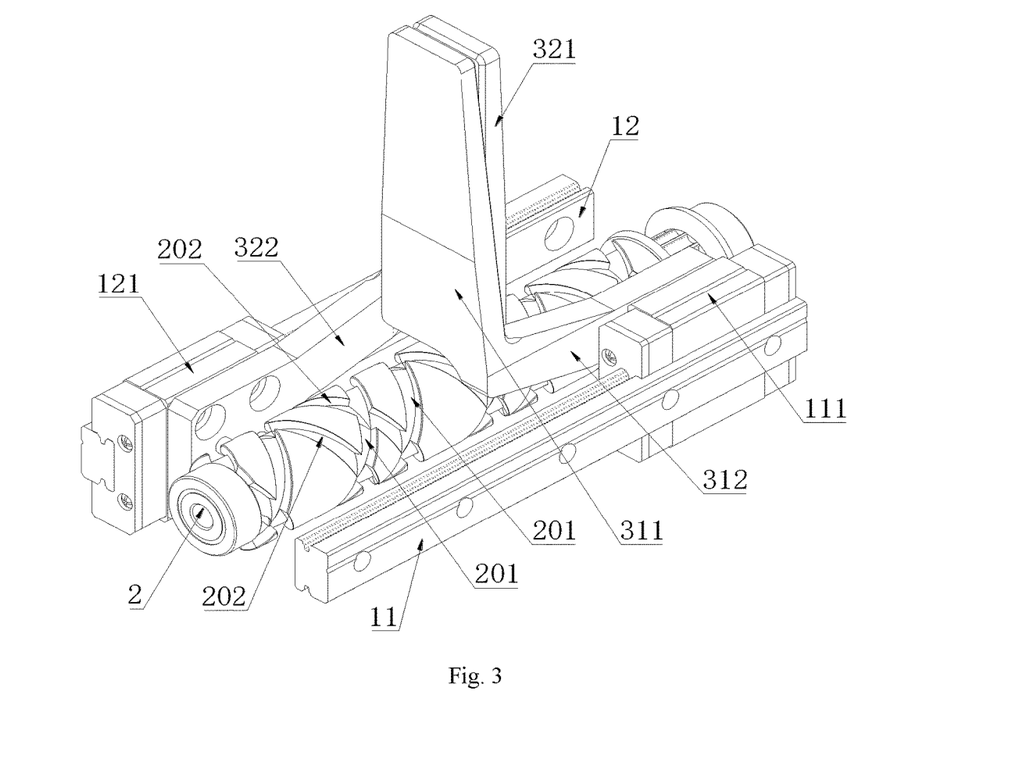
FIG. 3 is a perspective view of a gripper according to an embodiment of the present disclosure, in which the first gripping jaw and the second gripping jaw are in contact and the distance between the first gripping portion and the second gripping portion is the minimum gripping distance.

According to an embodiment of the present disclosure, when the screw 2 is rotated, the first pins 313 is allowed to be moved from the first ends of the first spiral tracks 201 to the second ends of the first spiral tracks 201 (as long as there is one first pin 313 close to the second end of the corresponding first spiral track 201), and the second pins 323 is allowed to be moved from the second ends of the second spiral tracks 202 to the first ends of the second spiral tracks 202 (as long as there is one second pin 323 close to the first end of the corresponding second spiral track 202). At this time, the first gripping jaw 31 and the second gripping jaw 32 are in a state of being close to each other and the gripping distance between them is taken as the minimum gripping distance (the first gripping jaw 31 and the second gripping jaw 32 are closed to the minimum extent). In this embodiment, as shown in FIG. 3, the minimum gripping distance is zero. In other embodiments, the minimum gripping distance may be greater than zero.

According to the gripper of this embodiment of the present disclosure, a portion of a coverage of the first spiral track 201 overlaps a portion of a coverage of the second spiral track 202 along a length of the spiral portion 20. By properly configuring the first gripping jaw 31 and the second gripping jaw 32, when the first pins 313 and the second pins 323 pass through the spiral cross section, it is possible to avoid the problem that the effective movements of the first spiral track 201 and the second spiral track 202 are shortened due to the interference between the first gripping jaw 31 and the second gripping jaw 32. In this embodiment, the effective movement of the first gripping jaw 31 is substantially equal to an axial length of each first spiral track 201, and the effective movement of the second gripping jaw 32 is substantially equal to an axial length of each second spiral track 202, so that the sum of the effective movements of the first gripping jaw 31 and the second gripping jaw 32 is greater than an axial length of the spiral portion 20, which can greatly reduce the axial length of the lead screw 2 and the space occupied by the lead screw 2 without reducing the stroke of the gripper. Thus, the implementation of the present disclosure may facilitate the miniaturization and compact design of the gripper, and reduce the weight of the gripper, while ensuring the maximum gripping distance between the first gripping jaw 31 and the second gripping jaw 32.

It can be understood that, when the spiral portion 20 is consistent with the spiral cross section, the axial length of the lead screw 2 can be the shortest compared with other configurations. At this time, the sum of the effective movements of the first gripping jaw 31 and the second gripping jaw 32 is approximately twice the axial length of the spiral portion 20. In addition, the speed of the change of the gripping distance between the first gripping jaw 31 and the second gripping jaw 32 is increased correspondingly.

Figure 5:
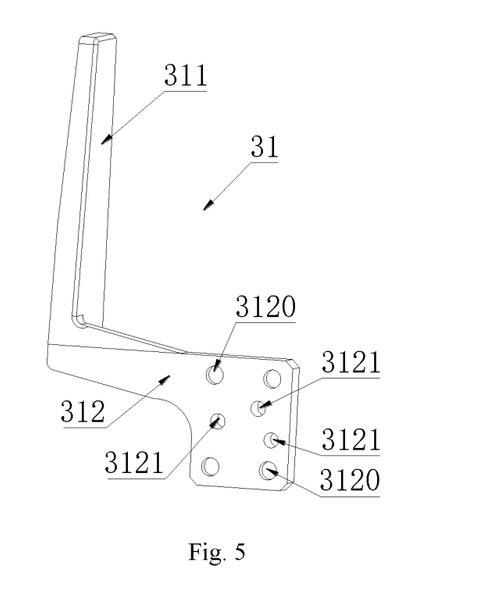
FIG. 5 is a perspective view of the first gripping jaw in FIG. 1.

It should be noted that although in this embodiment, there are two first spiral tracks 201 and two second spiral tracks 202, in other embodiments, the number of the first spiral track 201 and the second spiral track 202 is not limited to two, for example, it may be one or more than two. In these cases, the number of the first pin 313 and the second pin 323 can be changed accordingly. In addition, the number of the first pin 313 extending into the same first spiral track 201 may be one, two or more. The number of the second pin 323 extending into the same second spiral track 202 may be one, two or more. Referring to FIG. 5, in this embodiment, the number of the first pin 313 may be three, and the number of the second pin 323 may also be three.

In some embodiments, by properly arranging the positions of the first pins 313 on the first gripping jaw 31 and the positions of the second pins 323 on the second gripping jaw 32, it is ensured that at least two first pins 313 are not at the intersections of the first spiral tracks 201 and the second spiral tracks 202 at the same time when they are moving along the first spiral tracks 201, and at least two second pins 323 are not at the intersections of the first spiral tracks 201 and the second spiral tracks 202 at the same time when they are moving along the second spiral tracks 202. In other words, the first spiral tracks 201 and the second spiral tracks 202 are configured such that the at least two first pins 313 arrive at intersections of the first spiral tracks 201 and the second spiral tracks 202 at different times during rotation of the spiral portion 20, and similarly, the at least two second pins 323 arrive at the intersections of the first spiral tracks 201 and the second spiral tracks 202 at different times during rotation of the spiral portion 20. In this way, it can be ensured that at least one first pin 31 and at least one second pin 32 are normally driven by the first spiral tracks 201 and the second spiral tracks 202 at any time during the rotation of the spiral portion 20, without being affected by the intersections, and thus, the reliability of the movements of the first gripping jaw 31 and the second gripping jaw 32 can be ensured.

In an implementation, any adjacent two intersections of the first spiral tracks 201 and the second spiral track 202 are not in a same line on a surface of the spiral portion 20 that is parallel to an axis of the spiral portion 20. Meanwhile, the first pins 313 are arranged in line with the arrangement of the pin hole 3121 to which the first pins 313 are installed, and the second pins 323 are arranged in a similar way. By such configuration, the first pins 313 arrive at intersections of the first spiral tracks 201 and the second spiral track 202 at different times during rotation of the spiral portion 20, and similarly, the second pins 323 arrive at intersections at different times during rotation of the spiral portion 20.

Referring to FIGS. 1 and 3, some embodiments of the first gripping jaw 31 and the second gripping jaw 32 are shown in this embodiment. The first gripping jaw 31 includes a first gripping portion 311 and a first connecting portion 312. A first end of the first connecting portion 312 is connected to the first gripping portion 311, and a second end of the first connecting portion 312 protrudes laterally from the first gripping portion 311 and is suitable to be slidably connected to the first guiding mechanism 1a. The first pins 313 are provided at the second end of the first connecting portion 312. The second gripping jaw 322 includes a second gripping portion 321 and a second connecting portion 322. A first end of the second connecting portion 322 is connected to the second gripping portion 321, a second end of the second connecting portion 322 protrudes laterally from the second gripping portion 321 and is suitable to be slidably connected to the second guiding mechanism 1b. The second pins 323 are provided at the second end of the second connecting portion 322. The distance between the first gripping portion 311 and the second gripping portion 321 in the direction parallel to the lead screw 2 when the first gripping portion 311 and the second gripping portion 321 are located at their largest distance is referred to as the maximum gripping distance, and the gripper grasps or releases objects through the first gripping portion 311 and the second gripping portion 321. In this embodiment, as shown in FIGS. 1 and 2, the first gripping portion 311 and the second gripping portion 321 are located at their largest distance and each is disposed outside the first and second ends of the spiral portion 20 when the maximum gripping distance is provided. As shown in FIGS. 3 and 4, the first gripping portion 311 and the second gripping portion 321 are located at their smallest distance and each is at the middle of the spiral portion 20 when the minimum gripping distance is provided.

In some embodiments, lengths of the first connecting portion 312 and the second connecting portion 322 in the direction parallel to an extending direction of the lead screw 2 can be adjusted. For example, the first connecting portion 312 and the second connecting portion 322 are respectively telescopic arms to meet various gripping requirements. In addition, in this embodiment, the first connecting portion 312 and the second connecting portion 322 may extend parallel to the lead screw 2. It should be understood that, in other embodiments, the first connecting portion 312 and the second connecting portion 322 may extend, for example, obliquely with respect to the lead screw 2.

The first connecting portion 312 can be slidably connected to the first guiding mechanism 1a in any suitable manner to guide the first gripping jaw 31 to perform the first linear movement in the direction parallel to the lead screw 2. In the same way, the second connecting portion 322 can be slidably connected to the second guiding mechanism 1b in any suitable manner to guide the second gripping jaw 32 to perform the second linear movement in the direction parallel to the lead screw 2. As described above, the moving direction of the first gripping jaw 31 and the moving direction of the second gripping jaw 32 are always opposite.

Some embodiments of the first guiding mechanism 1a and the second guiding mechanism 1b are also shown in this embodiment. The first guiding mechanism 1a includes a first linear guiding rail 11 and a first slider 111, the first linear guiding rail 11 is parallel to the lead screw 2, and the second end of the first connecting portion 312 is slidably connected to the first linear guiding rail 11 through the first slider 111. For example, referring to FIG. 5, the second end of the first connecting portion 312 is provided with several mounting holes 3120, and several fasteners (not shown) passing through the mounting holes 3120 are connected to the first slider 111, thereby fixing the second end of the first connecting portion 312 on the first slider 111. The second guiding mechanism 1b includes a second linear guiding rail 12 and a second slider 121, the second linear guiding rail 12 is parallel to the lead screw 2, and the second end of the second connecting portion 322 is slidably connected to the second linear guiding rail 12 through the second slider 121. In order to further optimize the structure of the gripper to make the gripper more compact, the lead screw 2 can be located between the first guiding mechanism 1a and the second guiding mechanism 1b, allowing the first gripping jaw 31 and the first guiding mechanism 1a are located on one side of the lead screw 2, and the second gripping jaw 32 and the second guiding mechanism 1b are located on the other side of the lead screw 2. In some embodiments, the lead screw 2 may be located between the first linear guiding rail 11 and the second linear guiding rail 12.

In an embodiment not shown, the first guiding mechanism 1a may include a first guiding rod. The first guiding rod is parallel to the lead screw 2, and the first connecting portion 312 is provided with a first hole that is slidably engaged with the first guiding rod. The second guiding mechanism 1b may include a second guiding rod. The second guiding rod is parallel to the lead screw 2, and the second connecting portion 322 is provided with a second hole that is slidably engaged with the second guiding rod. In some embodiments, the lead screw 2 can be located between the first guiding rod and the second guiding rod.

It should be noted that there are many implementations of the first guiding mechanism 1a and the second guiding mechanism 1b, which are not limited to the above examples, as long as they can restrict the rotation of each of the first gripping jaws 31 and the second gripping jaws 32 relative to the lead screw 2.

Figure 6:
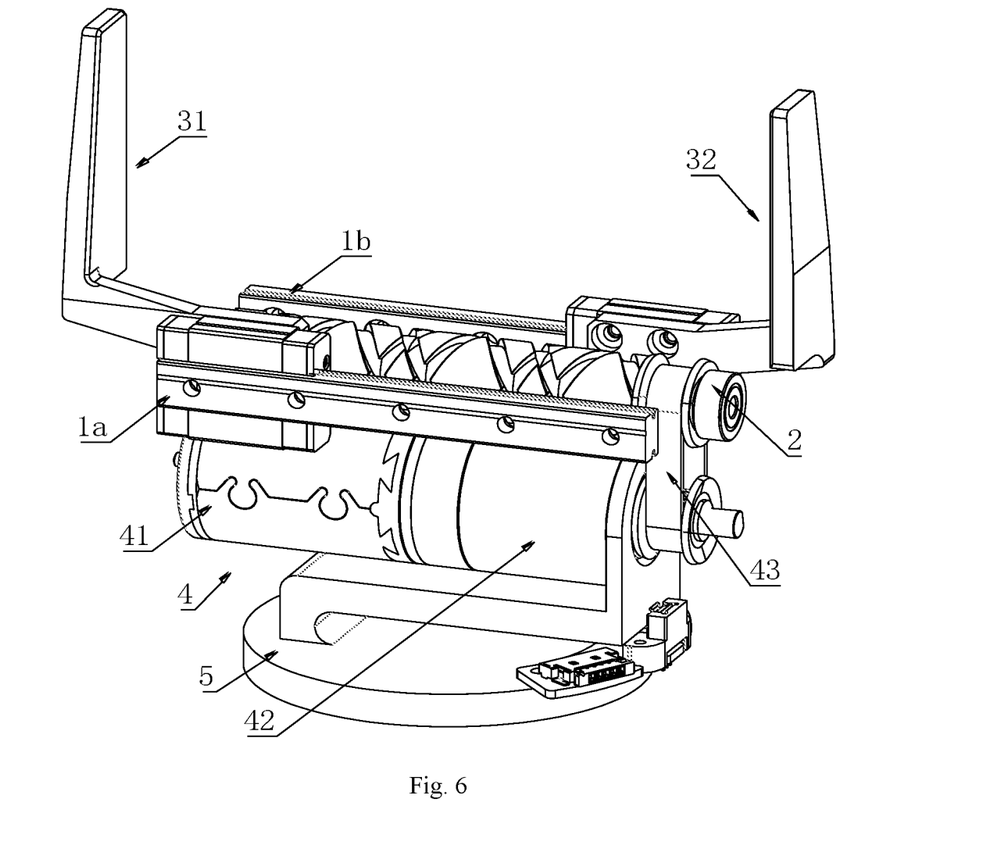
FIG. 6 is a perspective view of a gripper according to an embodiment of the present disclosure.

Referring to FIG. 6, the gripper provided by this embodiment may further include a power mechanism 4, and the power mechanism 4 is connected to the driving portion 25 of the lead screw 2. The power mechanism 4 can drive the lead screw 2 to rotate in the first direction or in the second direction opposite to the first direction, so that the first pins 313 and the second pins 323 perform linear movements in the opposite direction to make the first gripping portion 311 and the second gripper portion 312 move toward or away from each other.

The power mechanism 4 may include a motor 41 and a reducer 42, and the reducer 42 is connected between the motor 41 and the driving portion 25 of the lead screw 2. Alternatively, as shown in this embodiment, the power mechanism 4 may include a motor 41, a reducer 42 and a transmission mechanism 43, and the power mechanism 4 may be mounted on the base 5, for example. The motor 41 is connected to the reducer 42, and they are located below the lead screw 2 together. The transmission mechanism 43 is used for transmitting the power output from the reducer 42 to the driving portion 25 of the screw 2. The transmission mechanism 43 may be, for example, a chain transmission mechanism, a belt transmission mechanism, a gear transmission mechanism, or the like. The lead screw 2, the motor 41, and the reducer 42 are located on the same side of the transmission mechanism 43. In this way, the structure of the gripper is more compact, and the axial space occupied by the gripper is smaller, which is more helpful for the gripper to enter a narrow space to grasp objects.

The present disclosure also provides an embodiment of a robotic arm including the above-mentioned gripper. Because the gripper of the present disclosure can achieve the above-mentioned technical effects, the robotic arm including the gripper can also achieve corresponding technical effects, and can reach into a narrow space for grasping objects.

In accordance with the embodiments of the present disclosure, the effective movement travel of the first gripping jaw is allowed to be substantially equal to an axial length of the first spiral track, and the effective movement travel of the second gripping jaw is allowed to be substantially equal to an axial length of the second spiral track, so that the sum of the effective movement travels of the first gripping jaw and the second gripping jaw is greater than an axial length of the spiral portion, which can greatly reduce the axial length of the lead screw and the space occupied by the lead screw on the basis of ensuring the maximum gripping distance between the first gripping jaw and the second gripping jaw, facilitating the miniaturization and compact design of the gripper, and facilitating to reduce the weight of the gripper.

The above-mentioned embodiments only describe a few implementations of the present disclosure, and the description is relatively specific and detailed, but they should not be interpreted as a limitation on the scope of the patent disclosure.

It should be pointed out that for those skilled in the art, without departing from the concept of the present disclosure, several modifications and improvements can be made, and these all fall within the protection scope of the present disclosure. Therefore, the protection scope of the present disclosure shall be subject to the appended claims.

What is claimed is:

1. A gripper, comprising:
   a lead screw comprising a spiral portion and a driving portion, the spiral portion being provided with at least one first spiral track and at least one second spiral track with opposite helical directions, wherein a first end of the first spiral track corresponds to a first end of the spiral portion, and a second end of the first spiral track extends toward a second end of the spiral portion, wherein a second end of the second spiral track corresponds to the second end of the spiral portion, and a first end of the second spiral track extends toward the first end of the spiral portion, wherein a portion of a coverage of the first spiral track overlaps a portion of a coverage of the second spiral track along a length of the spiral portion; and
   a first gripping jaw and a second gripping jaw, the first gripping jaw having at least one first pin extending into the first spiral track, and the second gripping jaw having at least one second pin extending into the second spiral track,
   wherein the first gripping jaw and the second gripping jaw are configured in such a way that when the driving portion drives the spiral portion to rotate, the first spiral track drives the first pin to allow the first gripping jaw to perform a first linear movement in a direction parallel to the lead screw, and the second spiral track drives the second pin to allow the second gripping jaw to perform a second linear movement opposite to the first linear movement of the first gripping jaw,
   wherein the gripper further comprises:
   a first guiding mechanism slidably connected to the first gripping jaw and configured to guide the first linear movement of the first gripping jaw, and
   a second guiding mechanism slidably connected to the second gripping jaw and configured to guide the second linear movement of the second jaw,
   wherein the first gripping jaw and the first guiding mechanism are located on one side of the lead screw, and the second gripping jaw and the second guiding mechanism are located on the other side of the lead screw; and wherein the gripper further comprises a power mechanism connected to the driving portion for driving the driving portion to rotate.

2. The gripper according to claim 1,
wherein the first gripping jaw further comprises a first gripping portion and a first connecting portion, a first end of the first connecting portion being connected to the first gripping portion and a second end of the first connecting portion being slidably connected to the first guiding mechanism; the first pin being disposed at the second end of the first connecting portion; and
wherein the second gripping jaw further comprises a second gripping portion and a second connecting portion, a first end of the second connecting portion being connected to the second gripping portion and a second end of the second connecting portion being slidably connected to the second guiding mechanism, the second pin being disposed at the second end of the second connecting portion.

3. The gripper according to claim 2,
wherein the first guiding mechanism comprises a first linear guiding rail and a first slider, and the first connecting portion is slidably connected to the first linear guiding rail through the first slider, and
wherein the second guiding mechanism comprises a second linear guiding rail and a second slider, and the second connecting portion is slidably connected to the second linear guiding rail through the second slider, the first linear guiding rail, the lead screw and the second linear guiding rail being parallel to each other.

4. The gripper according to claim 2,
wherein the first guiding mechanism comprises a first guiding rod and the first connecting portion is provided with a first hole that is slidably engaged with the first guiding rod, and
wherein the second guiding mechanism comprises a second guiding rod and the second connecting portion is provided with a second hole that is slidably engaged with the second guiding rod, the first guiding rod, the lead screw and the second guiding rod extending substantially parallel to each other.

5. The gripper according to claim 2, wherein lengths of the first connecting portion and the second connecting portion are adjustable in a direction parallel to an extending direction of the lead screw.

6. The gripper according to claim 1,
wherein the at least one first spiral track comprises two first spiral tracks extending in parallel and spaced apart from each other in an axial direction of the lead screw, and the at least one first pin comprises at least two first pins each extending into a respective one of the two first spiral tracks; and
wherein the at least one second spiral track comprises two second spiral tracks extending in parallel and spaced apart from each other in the axial direction of the lead screw, and the at least one second pin comprises at least two second pins each extending into a respective one of the two second spiral tracks.

7. The gripper according to claim 6, wherein the first spiral tracks and the second spiral tracks are configured such that the at least two first pins arrive at intersections of the first spiral tracks and the second spiral tracks at different times during rotation of the spiral portion, and the at least two second pins arrive at the intersections of the first spiral tracks and the second spiral tracks at different times during rotation of the spiral portion.

8. The gripper according to claim 1, wherein the first spiral track and the second spiral track respectively extend over an entire length of the spiral portion.

9. A robotic arm comprising a gripper, the gripper comprising:
a lead screw comprising a spiral portion and a driving portion, the spiral portion being provided with at least one first spiral track and at least one second spiral track with opposite helical directions, wherein a first end of the first spiral track corresponds to a first end of the spiral portion, and a second end of the first spiral track extends toward a second end of the spiral portion, wherein a second end of the second spiral track corresponds to the second end of the spiral portion, and a first end of the second spiral track extends toward the first end of the spiral portion, wherein a portion of a coverage of the first spiral track overlaps a portion of a coverage of the second spiral track along a length of the spiral portion; and
a first gripping jaw and a second gripping jaw, the first gripping jaw having at least one first pin extending into the first spiral track, and the second gripping jaw having at least one second pin extending into the second spiral track,
wherein the first gripping jaw and the second gripping jaw are configured in such a way that when the driving portion drives the spiral portion to rotate, the first spiral track drives the first pin to allow the first gripping jaw to perform a first linear movement in a direction parallel to the lead screw, and the second spiral track drives the second pin to allow the second gripping jaw to perform a second linear movement opposite to the first linear movement of the first gripping jaw,
wherein the gripper further comprises:
a first guiding mechanism slidably connected to the first gripping jaw and configured to guide the first linear movement of the first gripping jaw, and
a second guiding mechanism slidably connected to the second gripping jaw and configured to guide the second linear movement of the second jaw,
wherein the first gripping jaw and the first guiding mechanism are located on one side of the lead screw, and the second gripping jaw and the second guiding mechanism are located on the other side of the lead screw, and
wherein the gripper further comprises a power mechanism connected to the driving portion for driving the driving portion to rotate.

10. The robotic arm according to claim 9,
wherein the first gripping jaw further comprises a first gripping portion and a first connecting portion, a first end of the first connecting portion being connected to the first gripping portion and a second end of the first connecting portion being slidably connected to the first guiding mechanism, the first pin being disposed at the second end of the first connecting portion; and
wherein the second gripping jaw further comprises a second gripping portion and a second connecting portion, a first end of the second connecting portion being connected to the second gripping portion and a second end of the second connecting portion being slidably connected to the second guiding mechanism, the second pin being disposed at the second end of the second connecting portion.

11. The robotic arm according to claim 10,
wherein the first guiding mechanism comprises a first linear guiding rail and a first slider, and the first connecting portion is slidably connected to the first linear guiding rail through the first slider, wherein the second guiding mechanism comprises a second linear guiding rail and a second slider, and the second connecting portion is slidably connected to the second linear guiding rail through the second slider, the first linear guiding rail, the lead screw and the second linear guiding rail being parallel to each other.

12. The robotic arm according to claim 10, wherein the first guiding mechanism comprises a first guiding rod and the first connecting portion is provided with a first hole that is slidably engaged with the first guiding rod, and wherein the second guiding mechanism comprises a second guiding rod and the second connecting portion is provided with a second hole that is slidably engaged with the second guiding rod, the first guiding rod, the lead screw and the second guiding rod extending substantially parallel to each other.

13. The robotic arm according to claim 10, wherein lengths of the first connecting portion and the second connecting portion are adjustable in a direction parallel to an extending direction of the lead screw.

14. The robotic arm according to claim 9, wherein the at least one first spiral track comprises two first spiral tracks extending in parallel and spaced apart from each other in an axial direction of the lead screw, and the at least one first pin comprises at least two first pins each extending into a respective one of the two first spiral tracks; and wherein the at least one second spiral track comprises two second spiral tracks extending in parallel and spaced apart from each other in the axial direction of the lead screw, and the at least one second pin comprises at least two second pins each extending into a respective one of the two second spiral tracks.

15. The robotic arm according to claim 14, wherein the first spiral tracks and the second spiral tracks are configured such that the at least two first pins arrive at intersections of the first spiral tracks and the second spiral tracks at different times during rotation of the spiral portion, and the at least two second pins arrive at the intersections of the first spiral tracks and the second spiral tracks at different times during rotation of the spiral portion.

16. The robotic arm according to claim 9, wherein the first spiral track and the second spiral track respectively extend over an entire length of the spiral portion.

\* \* \* \* \*